UNITED STATES PATENT OFFICE.

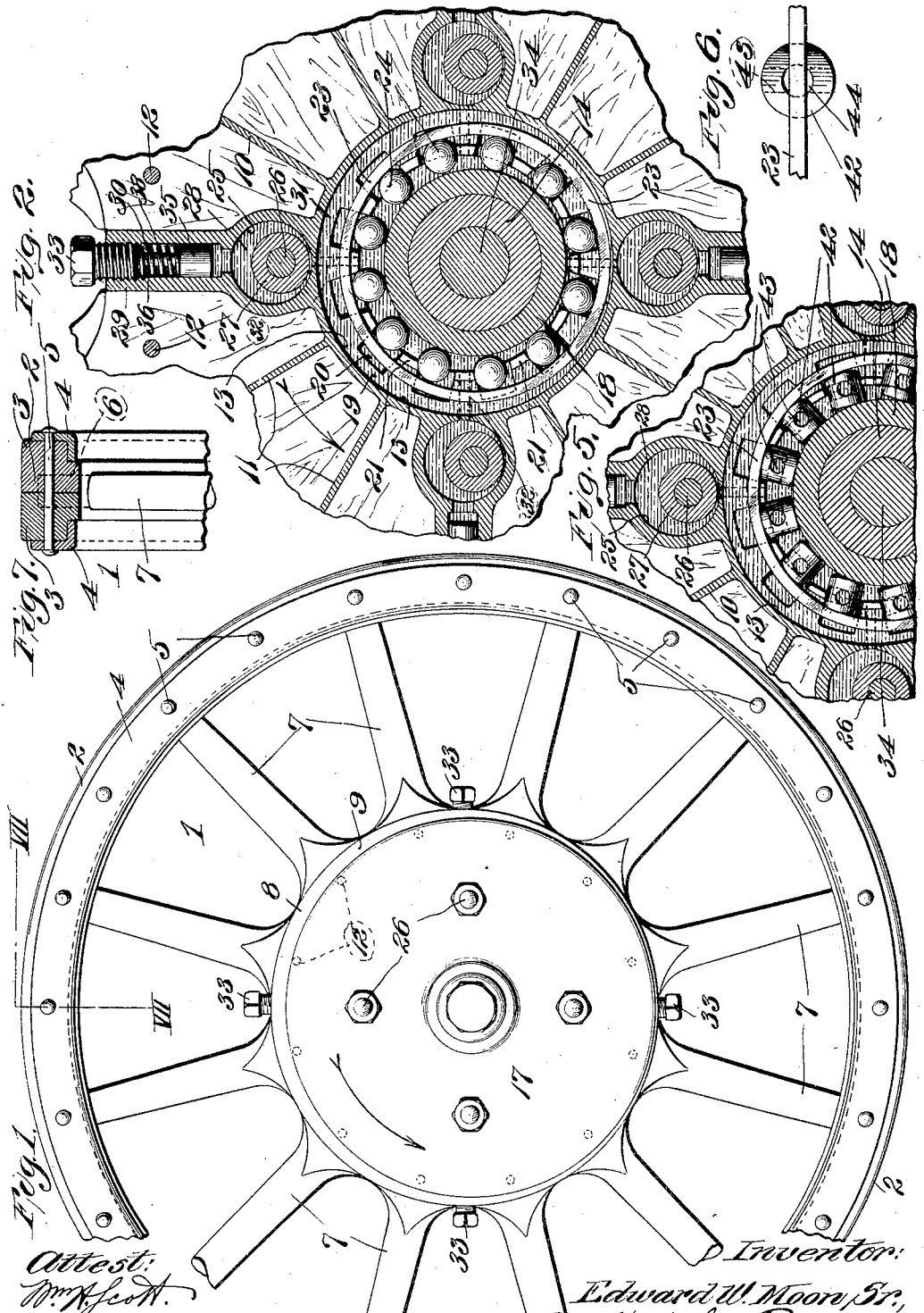

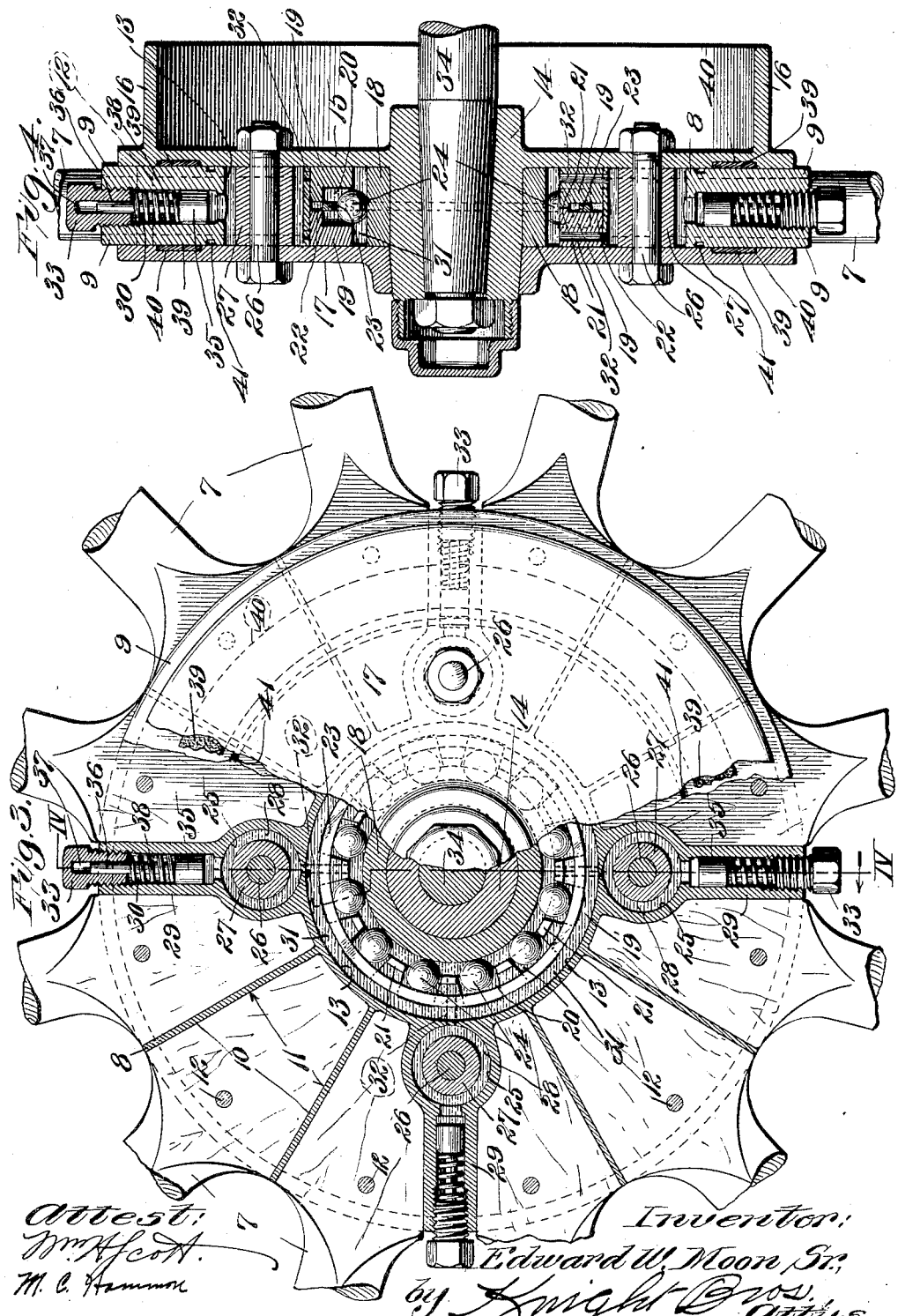

EDWARD W. MOON, SR., OF ST. LOUIS, MISSOURI.

VEHICLE-WHEEL.

1,089,428.

Specification of Letters Patent.   Patented Mar. 10, 1914.

Application filed March 19, 1913. Serial No. 755,389.

*To all whom it may concern:*

Be it known that I, EDWARD W. MOON, Sr., a citizen of the United States of America, residing in the city of St. Louis and State of Missouri, have invented certain new and useful Improvements in Vehicle-Wheels, of which the following is a specification.

The primary object of this invention is to provide a non-rigid connection between the wheel and the spindle or axle of a vehicle.

Another object is to provide means whereby a fluid is supplied between the hub and tread portions of a vehicle wheel so as to help to sustain the vehicle from shocks.

A further object is to provide means whereby a series of retarding elements are mounted in the wheel-hub and are adapted to retard the fluid contained therein during the travel of said fluid from one side of the hub to points there-adjacent which are under less pressure.

Another object is to provide the hub of a vehicle wheel with a series of radially arranged cylinders and a plunger arranged in each cylinder, said cylinders serving as a checking element against the rapid flow of fluid escaping from the cylinders during the travel of the wheel.

Another object is to provide an improved solid tire construction.

Other and further objects will appear in the specification, and be specifically pointed out in the appended claims, reference being had to the accompanying drawings exemplifying the invention, and in which, Figure 1 is a side elevation of this improved vehicle wheel. Fig. 2 is an enlarged vertical transverse section through the hub and axle portion of this improved wheel. Fig. 3 is an enlarged view, similar to Fig. 2, partly in section, and partly in side elevation. Fig. 4 is an enlarged vertical section taken on the line IV—IV, Fig. 3. Fig. 5 is a portion of a sectional view, similar to Fig. 2, but showing a different form of plungers in the cylinders. Fig. 6 is an enlarged plan view of one of the plungers shown in Fig. 5, and showing part of the retaining ring thereon. Fig. 7 is an enlarged section taken on the line VII—VII, Fig. 1.

Referring to the drawings: 1 designates a vehicle wheel having a solid tire 2, said tire being constructed of paper, wood or other analogous material, and is preferably made in half sections, as designated by 3. Said sections 3 are held together by the circular angles 4, having rivets 5 passed through said angles and said tire sections. This construction of tire will also serve as the felly of the wheel, the tenons 6 of the spokes 7 being seated in said tire sections 3.

Located in the central portion of the wheel is the spoke-hub 8, having vertical side flanges 9. A series of transverse partitions 10 are formed integral with said side flanges 9. Said flanges 9 and transverse partitions 10 form a series of pockets 11, the inner ends of the spokes 7 being mounted in said pockets. In order to securely fasten said spokes in their respective pockets, rivets 12 are passed through said side flanges 9 and said spokes. Formed in said spoke hub 8 is a central cylindrical opening 13, said opening being of much larger diameter than the axle hub 14 which is mounted in said opening. Formed integral with said axle hub 14, and adjacent one end thereof, is an annular flange 15, said flange 15 being adapted to bear against the inner side flange 9 of the spoke hub 8, there being formed on said flange 15 a brake wheel 16. Mounted on one end of the axle hub 14, opposite to the end on which flange 15 is secured, is an annular flange 17, said flange 17 adapted to bear against the outside side flange 9 of the spoke hub 8. Securely mounted to the axle hub 14 is a collar 18, the side edges of which are adapted to abut the inside walls of the flanges 15 and 17.

Mounted in the central annular opening 13 of the spoke hub 8 are a pair of rings 19, said rings being secured in the cylindrical opening 13 in some manner. There are formed in said rings a series of cylinders 20, said cylinders being radially arranged from the center of said cylindrical opening 13. In the forming of said cylinders 20 in the rings 19, the rings are placed side by side. In the formation of each ring there is a semi-annular recess. When mounted together, these semi-annular recesses will be disposed opposite to each other, thus forming the cylinders 20.

Formed between the cylinders 20 of the rings 19 are abutting edges 21. Formed between the rings 19 is an annular recess 22. Mounted in said recess 22 is a retaining ring 23, said ring adapted to retain a series of plunger balls 24 against the peripheral edge of the collar 18. Said plunger balls are radially arranged around the collar 18, there being a plunger ball for each cylinder. Said cylinders are slightly larger in diameter than said plunger balls.

Arranged radially around the cylindrical opening 13 of the spoke hub 8 are a series of cylindrical openings 25, said openings being for the reception of bolts 26, said bolts being for the purpose of holding the flanges 15 and 17 in sliding contact with the side flanges 9. In order to prevent said flanges 15 and 17 from being drawn too tightly together, sleeves 27 are mounted on the bolts 26. It is to be noted that the cylindrical openings 25 are much larger in diameter than the sleeves 27, in which event there will be annular chambers 28 formed around said sleeves 27. In the construction shown, there are four annular chambers 28 in connection with a wheel of this improved construction. But, if necessary, in improved wheels of this character more chambers can be formed.

Inasmuch as the interior of the spoke hub 8 is to be filled with oil, it is thought preferable to construct the oil-filling means between spokes, as shown. In order to do this, some of the partitions are enlarged adjacent their center, as shown at 29, there being a passageway 30 formed therein. Said passageway is adapted to communicate with the chamber 28. In order to admit oil into the spoke-hub chamber 31, which is formed between the outer periphery of the collar 18 and the inner periphery of the spoke hub 8, openings 32 are formed between said chamber 28 and the hub chamber 31. Mounted in each passageway 30 is a closure cap 33.

In a wheel of this improved construction, which is non-rigid—that is to say, the wheel proper is rigid from the spoke hub to the outside periphery of the tire, but the connection between the axle hub and the spoke hub is non-rigid—there always will be a displacement of the axle hub to the spoke hub relative to each other.

In the operation of this improved wheel, assuming that the space between the spoke hub 8 and the collar 18, mounted on the axle hub 14, which has been designated as chamber 31, has been filled with oil, the filling, of course, being done through one of the passageways 30, the chambers 28 also being filled with oil, the weight of the vehicle will naturally rest against the lower cylindrical wall of the spoke hub 8. And, as is shown in Fig. 2, the retaining ring will rest on the lower cylindrical wall of said spoke hub 8, and the lowermost balls will rest on said retaining ring. The axle hub 14, through the medium of the collar 18, will rest on the lowermost balls. Hence, there will be an eccentric relation between the axle 34 of the vehicle and the vehicle wheel 1, and the lowermost balls 24 will be entirely within the cylinders 20, whereas the uppermost balls will be well out of their cylinders. Assume that the wheel is turned in the direction of the arrow shown in Figs. 1 and 2. As the wheel is turned around the balls will be gradually pushed into their respective cylinders. As the balls are but little smaller in diameter than the cylinders, the oil, which is in the cylinders, will be forced out and crowded between the respective balls and their cylinders, which will retard the outlet of the oil somewhat, and therefore produce a cushioning effect to the vehicle. It is to be noted that the retaining ring is adapted to hold the plunger balls 24 constantly on the periphery of the collar 18. By this arrangement, as the balls are carried upwardly, they will gradually be withdrawn from the cylinders 20.

The axle hub 14 and the parts relating thereto, such as the flanges 15 and 17, bolts 26, and sleeves 27, are arranged concentric with the axle. When the vehicle is not moving, said parts will assume an eccentric relation to the vehicle wheel. As power is applied to the wheel or axle, as the case may be, there will be a twist relative to the parts relating to the axle hub 14, and the vehicle wheel, until the twisting movement is limited by the sleeves 27 abutting the side walls of the chambers 28. It is thought that when a vehicle wheel of this improved construction has gained a certain momentum, the parts relating to the axle hub will assume a concentric relation with the vehicle wheel, such position being shown in Fig. 3.

In order to insure that the chamber 31 and chambers 28 are filled with oil, there being a liability of a possible leakage during the operation of this wheel, plungers 35 are located in the passageways 30. Each of said plungers has a guiding portion 36 slidably mounted in recesses 37, formed in the closure caps 33. Springs 38 are adapted to engage against the plungers 35 and closure caps 33. These springs will bear against said plungers, thus keeping said plungers against the body of oil contained within the hub 8.

During the operation of this improved wheel, there will be more or less of a sliding movement between the flanges 15, 17 of the axle hub 14 and the side flanges 9 of the spoke hub 8. In order to prevent the escape of oil in consequence of said sliding relation, circular packings 39 are mounted in recesses 40, said recesses 40 being formed on the inside faces of the flanges 15 and 17. In order to assist said packing, circular oil grooves 41 are formed on the side faces of the flanges 9.

In Fig. 5, a different form of plungers is reciprocably mounted in the cylinders 20, such as the pistons 42, the remainder of the wheel construction being the exact reproduction of the parts heretofore described.

Formed in each piston 42, and extending transversely therethrough, is an opening 43. Communicating with said opening is a central opening 44, which central opening is adapted to communicate with the cylinder 20. These pistons 42 are slightly smaller in diameter than the cylinders 20. As said pistons are forced into their respective cylinders, the oil will escape from said cylinders past the periphery of said pistons, and also through the openings 44 and 43. As the pistons are pushed into the cylinders a certain distance, the openings 43 are cut off by the cylinders, so that there will be no further escape of oil therethrough, the only escape of oil then being by the periphery of the pistons.

During the operation of a wheel of this improved construction, it is readily seen how, if a sudden jolt is given to the vehicle wheel, the tendency will be to push that side of the spoke hub adjacent the force of the blow toward the axle support, which action will drive the plungers into the cylinders. As the oil contained in said cylinders will be retarded during its escape past the plungers, a cushioning effect to the vehicle will be produced.

What I claim is:

1. In a vehicle wheel, a pair of hubs therefor, a series of cylinders radially arranged on the interior of one of said hubs, said cylinders adapted to contain a fluid, plungers mounted in said cylinders, a retaining ring for said plungers, said plungers adapted to retard the flow of fluid from said cylinders.

2. In a vehicle wheel, a pair of hubs therefor, a series of cylinders radially arranged on the interior of one of said hubs, said cylinders adapted to contain a fluid, plungers adapted to reciprocate in said cylinders, a retaining ring for said plungers, said ring adapted to hold one end of said plungers against one of said hubs, said plungers adapted to retard the flow of fluid from said cylinders.

3. In a vehicle wheel, an axle hub adapted to be mounted on an axle, an outer hub adapted to be loosely mounted on said axle hub yet turnable therewith, a chamber formed between said hubs, a series of auxiliary chambers formed around said chamber, recesses located between said hubs in said chamber, said recesses and said chambers adapted to contain a fluid, plungers mounted in said recesses, means for successively reciprocating said plungers in said recesses, side flanges forming side walls to said chambers, and bolts passing through said auxiliary chambers and said flanges.

4. In a vehicle wheel, a pair of hubs therefor, a series of cylinders radially arranged on the interior of one of said hubs, said cylinders adapted to contain a fluid, plungers mounted in said cylinders, a retaining ring for said plungers, said plungers adapted to retard the flow of fluid from said cylinders, said retaining ring forming means for successively drawing the plungers from their respective cylinders.

5. In a vehicle wheel, the combination of a pair of hubs, with a felly, one of said hubs adapted to be mounted on an axle, the other said hub being carried by the felly, an annular chamber formed between said hubs, side flanges mounted on said axle hub, said felly hub being slidably mounted between said flanges, auxiliary chambers formed in said felly hub, means of communication between said annular chamber and said auxiliary chambers, bolts passing through said side flanges and said auxiliary chambers to limit the sliding movement between said axle hub and said felly hub, said flanges forming side walls to said chambers, said annular chamber and said auxiliary chambers adapted to contain a fluid.

6. A wheel having a pair of hubs and a felly, one of said hubs being carried by said felly, recesses formed in one of said hubs, a plunger mounted in each of said recesses, auxiliary chambers formed adjacent said recesses, said recesses and said chambers adapted to contain a fluid, said plungers adapted to retard the flow of fluid from said recesses, side flanges carried by one of said hubs, said flanges adapted to bear against the other said hub, bolts passing through said chambers and said flanges, and means of communication formed between said recesses and said chambers.

EDWARD W. MOON, Sr.

Witnesses:
H. G. FLETCHER,
M. C. HAMMON.